United States Patent [19]
Perret et al.

[11] 3,879,530
[45] Apr. 22, 1975

[54] METHOD FOR THE COMBUSTION OF SULPHUR

[75] Inventors: Jean-Pierre Perret, Tarnos; Bruno Vidon, Suresnes, both of France

[73] Assignee: Societe Anonyme Pechiney Ugine Kuhlmann, Paris, France

[22] Filed: Mar. 8, 1972

[21] Appl. No.: 232,672

[30] Foreign Application Priority Data
Mar. 10, 1971  France .......................... 71.08343

[52] U.S. Cl. ............................. 423/543; 23/278
[51] Int. Cl. ............................. C01b 17/54
[58] Field of Search ................... 423/543; 23/278

[56] References Cited
UNITED STATES PATENTS

| | | | |
|---|---|---|---|
| 1,720,742 | 6/1929 | Mullen | 23/278 |
| 1,917,692 | 7/1933 | Bencowitz | 23/278 |
| 2,072,375 | 3/1937 | McCallum | 23/278 X |
| 2,705,671 | 4/1955 | Bencowitz | 23/278 |
| 2,822,245 | 2/1958 | Shipman et al. | 423/543 |

FOREIGN PATENTS OR APPLICATIONS

| | | | |
|---|---|---|---|
| 731,398 | 5/1966 | Canada | 23/278 |
| 1,030,917 | 5/1966 | United Kingdom | 423/543 |

*Primary Examiner*—Oscar R. Vertiz
*Assistant Examiner*—Brian E. Hearn
*Attorney, Agent, or Firm*—Synnestvedt & Lechner

[57] ABSTRACT

A method and an apparatus for the combustion of liquid sulphur in a combustion chamber. The injection device for the liquid sulphur and the primary air comprises a double spraying arrangement: a simple mechanical spraying device in which the liquid sulphur is driven through a spray nozzle without the aid of an auxiliary driving fluid and a pneumatic spraying device in which a turbulent rotational primary air stream mixes with the relatively coarse spray produced by the spray nozzle through a constriction zone and into the combustion chamber, transforming the relatively coarse spray into a relatively fine spray. The fine spray enters the combustion chamber at the apex of a conical end wall of the combustion chamber and is driven into contact with the conical end wall due to the whirling action of the primary air. Secondary air is introduced along the lateral walls of the combustion chamber, in order to protect these walls of refractory material from the radiation heat produced during combustion.

9 Claims, 4 Drawing Figures

METHOD FOR THE COMBUSTION OF SULPHUR

This invention relates to the field of the combustion of sulphur and in particular to the manufacture of sulphuric acid.

In the most commonly used apparatus for the combustion of sulphur, sulphur in a liquid state is brought to a mechanical spraying device which is followed by a combustion chamber. The droplets of sulphur are vaporized in the chamber and sulphur vapour obtained is burned therein.

The mechanical spraying is effected by passing liquid sulphur under pressure through a calibrated small-diameter orifice, called a spray nozzle (without an auxiliary driving fluid). In order to avoid the frequent clogging of the spray nozzle by solid particles always present in the liquid sulphur, very small diameter spray nozzles are not used, and one has had to be content with relatively coarse sprays. The droplets of sulphur are therefore long in evaporating and the combustion chamber must be of relatively large dimensions: in a 1 $m^3$ chamber an input flow rate of sulphur in the order of 100 kg per hour is most common.

In order to accelerate the evaporation of the sulphur it has already been proposed to create turbulent movements in the combustion chamber by setting into rotation liquid sulphur arriving at the spray nozzle or by placing baffles in the combustion chamber.

Another known method of burning sulphur consists in the spraying of sulphur with compressed air, known as pneumatic spraying, and passing the mixture thus obtained through a fluidized bed of refractory material.

It has also been proposed to evaporate the sulphur in a fluidized bed by using heat coming from the combustion of a portion of the sulphur and burning the vapour obtained in an independent chamber.

When the combustion of sulphur must be effected in a pressurized container, as in the case of methods of manufacturing sulphuric acid operating under pressure, for reasons of economy, simple devices having as small a volume as possible have been sought.

Certain prior art methods have proposed the combustion of liquid hydrocarbons (fuel-oil) or gas hydrocarbons (natural gas, butane, propane, etc.). Such methods consist in effecting a rapid vaporization of the sprayed fuel by heat transfer between a very hot, axial, low-pressure zone situated downstream of the fuel injection device and the droplets of the fuel directed axially, obliquely or laterally with respect to the axis of the combustion chamber. Such known methods are not directly usable for the combustion of sulphur under pressure because the physical properties of liquid sulphur are very different from those of hydrocarbons and the heat of combustion is substantially greater; in particular the vapour tension of the sulphur and therefore its volatility is much lower than that of domestic fuel-oil for example, and its viscosity and its density does not enable the spraying of fine droplets under the same conditions as with hydrocarbons.

An aim of the present invention is a method and an apparatus specially adapted to the combustion of sulphur.

Another aim of the invention is a method for the combustion of liquid sulphur, which may be operated under pressure from atmospheric pressure up to 12 bars, and preferably up to about 6 bars.

Another aim of the invention is a method for the combustion of liquid sulphur directly producing a gas mixture suitable for the production of sulphuric acid, i.e. having a sulphur dioxide concentration between 4 and 15%, and preferably between 11 and 13%.

Another aim of the present invention is a method for the combustion of liquid sulphur in which the pressure differential between the primary combustion-supporting air and the pressure in the combustion chamber is not greater than 2 bars and preferably less than 1 bar.

Another aim of the invention is an apparatus for carrying out the method as described hereinabove, the said apparatus enables very high sulphur flow rates to be attained per unit volume of the combustion chamber.

Another aim of the invention is an apparatus of the type described having a simple construction and easy to maintain.

Various other advantages of the invention will be brought out in the detailed description which follows.

This invention relates to a method for the combustion of sulphur in which a spray of liquid sulphur is injected into a combustion chamber concurrently with a primary combustion-supporting gas, comprising first mechanically spraying the sulphur by passing the stream of liquid sulphur through a small-diameter orifice in the primary gas stream, then pneumatically spraying the sulphur by passing the mixture leaving the said orifice through a constriction zone coaxial with the axis defined by the orifice and the cylindrical combustion chamber, setting the primary gas into turbulent movement before its entry the constriction zone, introducing the mixture leaving the said zone into a space in the combustion chamber defined by a conical wall, the said wall being coaxial with the combustion chamber and forming one of the end portions thereof, the injection of the said mixture being effected in the vicinity of the apex of the conical end wall, and introducing a secondary combustion-supporting gas stream along the lateral walls of the combustion chamber beyond the conical space relative to the direction of flow of the said mixture.

Preferably, the pressure of the gaseous mixture in the combustion chamber is between atmospheric pressure and 12 bars, and preferably between atmospheric pressure and 6 bars.

Preferably, the liquid sulphur is introduced into the so-called mechanical spraying device in a liquid state at a temperature between 145° and 155°C.

Preferably, the pressure difference between the primary combustion-supporting gas used and the gas pressure in the combustion chamber is not greater than 2 bars, and preferably less than 1 bar.

The primary combustion-supporting gas flow rate is preferably equal to or greater than the flow rate of air corresponding to a stoichiometric combustion of sulphur into sulphur dioxide, the flow rate of the secondary combustion-supporting gas being calculated so as to provide the desired concentration of sulphur dioxide in the gaseous mixture leaving the combustion chamber.

Thus, the concentration of sulphur dioxide in the gaseous mixture leaving the combustion chamber is maintained between 4 and 15% and preferably between 11 and 13% by volume.

For the needs of the present method, air is suitable as the primary and secondary combustion-supporting gas.

One having ordinary skill in the art will therefor understand that an adjustment of the composition of the mixture leaving the combustion chamber is possible, for example for synthesizing sulphuric acid by simply varying the flow rate of the secondary combustion-supporting gas, such as air, being introduced into the combustion chamber. For automatic operation, the desired composition of the mixture may be controlled as a function of the flow rate.

The conical wall disposed immediately downstream of the injection zone after the constriction zone previously described has a dual function: (1) it creates a low pressure zone downstream of the injection zone which favours the formation of a fine, intimate liquid sulphur-air mixture and (2) it helps the guiding of the secondary air into the vicinity of the lateral walls of the combustion chamber.

The invention further consists in an apparatus for carrying out the method and comprises a liquid sulphur injection device, a primary combustion-supporting gas intake and a generally cylindrical combustion chamber, the said injection device being disposed along the axis of the chamber, a conical wall forming one of the end wall of the combustion chamber with its apex extending outwardly from the combustion chamber, the injection device for the liquid sulphur being disposed in the vicinity of the said apex and along the axis of the chamber, a so-called mechanical spraying device with a spray head being fixed axially along a tube partially closed off by a constricting member at the end of the chamber, the said tube comprising means for setting into rotational movement the primary combustion-supporting gas which circulates within the tube and means for carrying the secondary combustion-supporting gas into the combustion chamber in the vicinity of the lateral walls thereof beyond the conical end wall.

Preferably, the injection head comprises a double spraying system comprising a so-called mechanical spraying device and a pneumatic spraying device, the mechanical spraying device effecting a relatively coarse dispersion of liquid sulphur by passing it through a spray nozzle and a pneumatic spraying device transforming the relatively coarse spray into a relatively fine spray by passing the relatively coarse dispersion mixed with primary combustion air through a constriction member.

Preferably, the primary combustion-supporting gas used for pneumatic spraying of the relatively coarse liquid sulphur dispersion formed by the mechanical spraying device is set into rotational motion.

In a preferred embodiment, the rotational motion of the primary combustion-supporting gas is caused by inclined fins placed in the tube enclosing the mechanical spraying device and carrying the relatively coarse liquid sulphur spray in the primary combustion-supporting air towards the constriction member, which effects the pneumatic spraying of the coarse dispersion into a fine dispersion. It should also be noted that this arrangement of fins could be replaced by any other equivalent means for causing the rotational motion or turbulence of the primary air stream.

An embodiment of the apparatus according to the invention will now be described, but merely as an illustration and in no way as a limitation thereof, with reference to the accompanying drawings, in which:

FIG. 3 is a left sectional view along the line III—III in FIG. 1;

FIG. 4 is an enlarged sectional view taken along the line IV—IV of FIG. 1.

Figure 1:
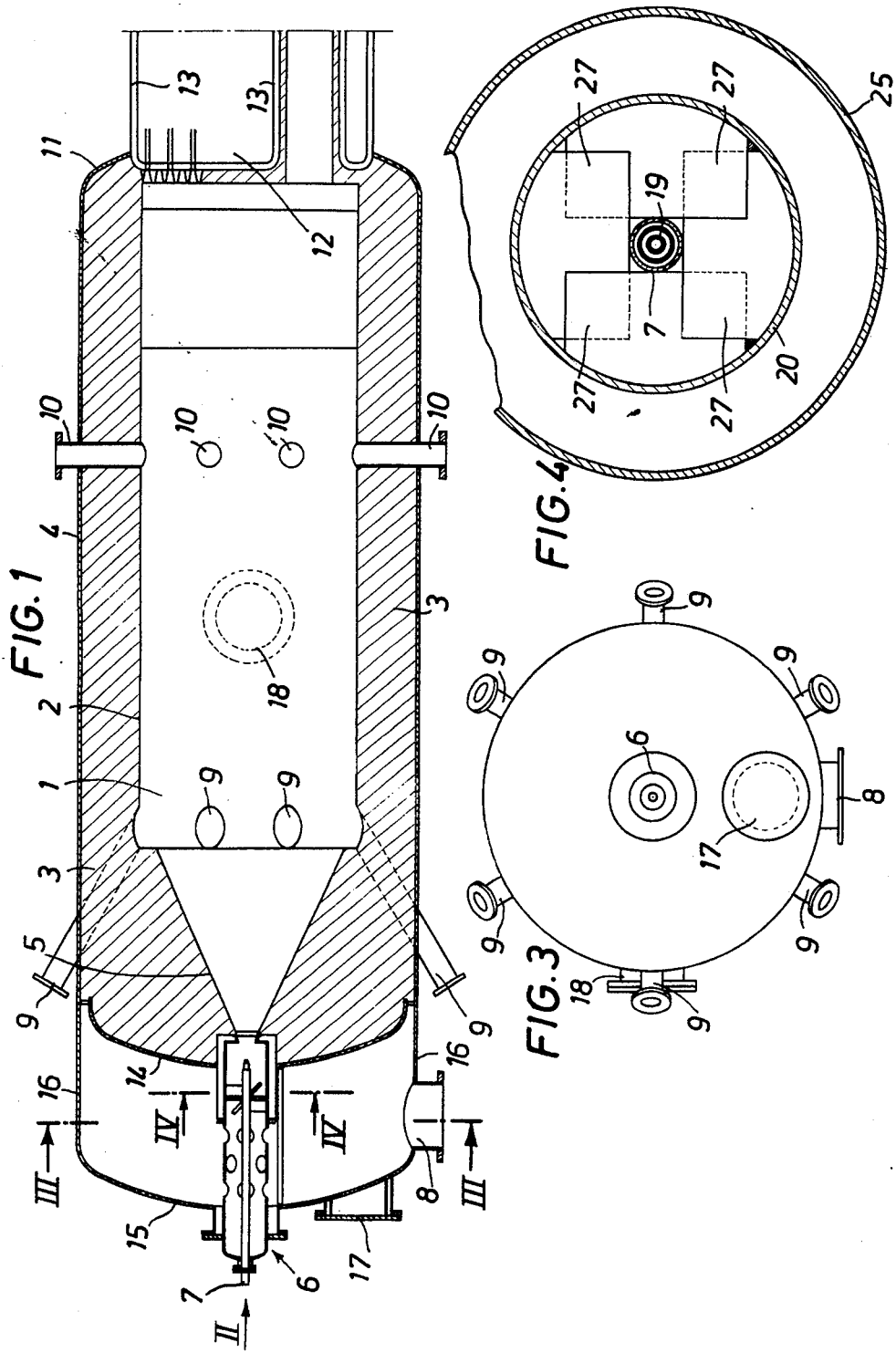
FIG. 1 is an axial section view of the sulphur burner.

The apparatus illustrated by way of example in the accompanying drawings is a sulphur burner.

The sulphur burner comprises a combustion chamber 1 of a generally cylindrical configuration with thermally insulated lateral walls 2 thermally insulating the chamber 1 from the exterior with a refractory liner or filler 3. The burner casing has the reference number 4. A conical wall 5 is disposed at the end of the chamber 1 (FIG. 1) for delimiting the end of the chamber. In an industrial construction the conical portion is hollowed out of the mass of refractory material forming the liner 3. The injection devices are designated generally by the reference numeral 6 and described hereinafter in detail (see FIG. 2) opening into the apex of the conical end wall 5. The conical end wall 5 opens into the combustion chamber 1 per se. The means 6 effect at the same time the injection of the sprayed sulphur and the primary combustion-supporting air. The liquid sulphur is introduced by the pipe 7. The primary air is introduced by the conduit 8.

The conduits 9 are provided for introducing secondary air into the chamber 1. In the preferred embodiment, there are six such conduits (see FIG. 3). The particular arrangement of the conduits 9, which open obliquely into the chamber 1 in the vicinity of the lateral walls 2 and downstream of the conical portion 5 in the direction of the fluid flow, has to be noted. FIG. 1 also shows the conduits 10 for the intake of additional, secondary air which are placed in the combustion chamber 1 further downstream. In the preferred embodiment the conduits 10 are also six in number. In an industrial arrangement the conduits 9, 10, for the secondary air will pass through the mass forming the refractory lining 3.

The burner casing is delimited by the lateral outer walls 4 and end walls. At the outlet of the burner the end wall 11 is traversed by an opening 12, which enables the free passage of burned gases containing $SO_2$. A boiler 13 is shown schematically at the outlet which takes advantage of the heat available in the exhaust gas.

A double end wall is provided at the inlet to the burner. A first end wall 14 extends between the lateral walls 4 and ends in the vicinity of the outlet end of the injection device 6. A second end wall 15 substantially parallel to the end wall 14 extends between the extensions 16 of the lateral walls and the inlet end of the injection device 6. The walls 14, 15 and 16 thus delimit a closed zone into which the primary air is introduced by the conduit 8. Openings 17, 18 are also shown in FIG. 1 which are closable in a fluid-tight manner by inspection ports associated with the injection device 6 and the combustion chamber 1 respectively.

Figure 2:
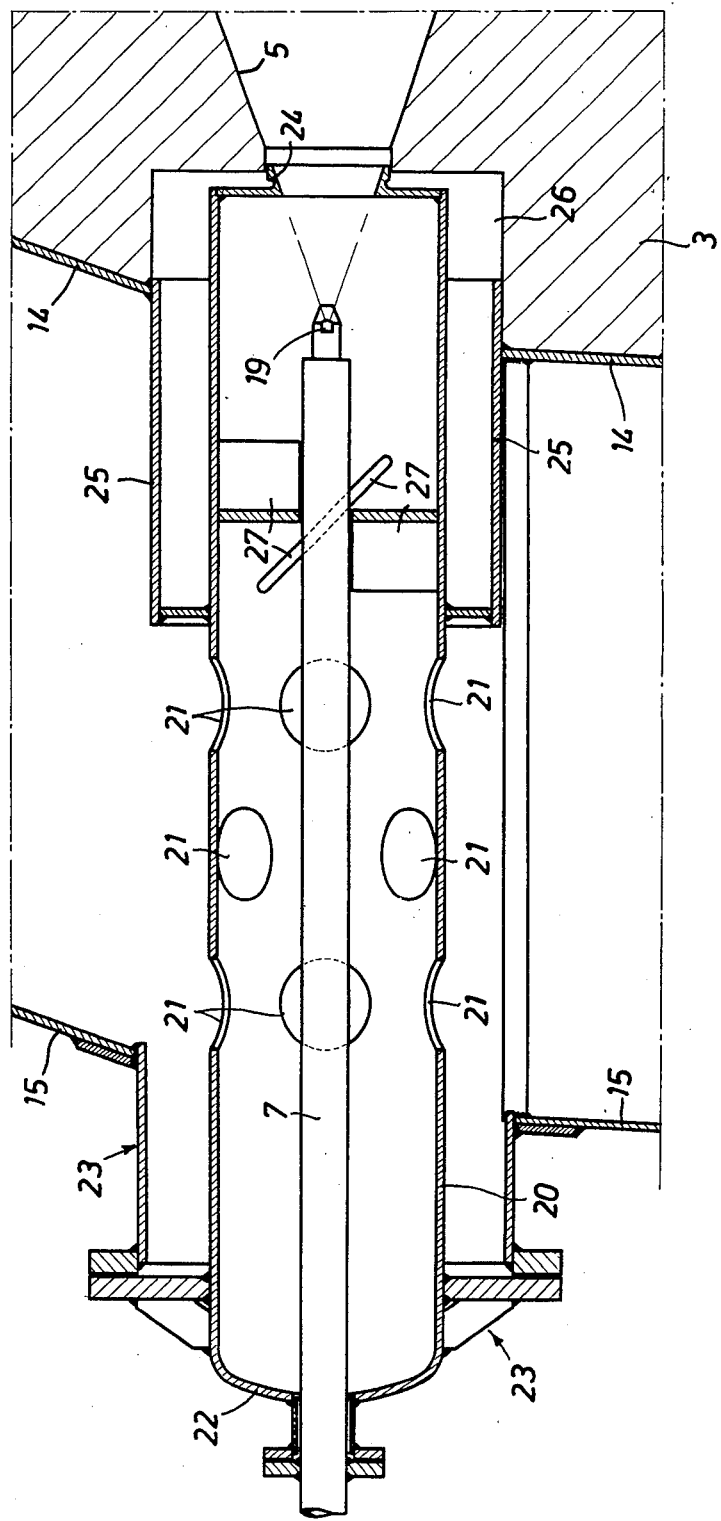
FIG. 2 is an axial section view on a larger scale of the sulphur injection means.

The injection device 6 will now be described in detail with reference to FIGS. 2 and 4. The injection device essentially comprises an axial pipe 7 for the liquid sulphur intake. The pipe 7 has a spray nozzle 19 at its end for ensuring the coarse mechanical spraying of the liquid sulphur in the primary air stream. The pipe 7 is surrounded at a certain distance by a tube 20 having orifices 21 for introducing primary air into the injection device. As can be seen from FIG. 2, the orifices 21 are in communication with the zone delimited by the walls 14, 15 described with respect to FIG. 1 and in which is carried the primary air. The tube 20 is closed off at its upstream end by an end wall 22 which closes off the pipe 7 in a fluid-tight manner. In the vicinity of this end, the wall 15 joins with the tube 20 by a welded sheet metal assembly generally designated by the reference numeral 23. This example which is conventional is clearly illustrated in the drawings.

At the other end, the tube 20 is provided with a constricting member or disphragm 24 which ensures the fine pneumatic spraying of the sulphur. The constricting member 24 is joined to the intake end of the conical end wall 5 described above. The insulating mass 3 which surrounds the conical end wall is also shown. The wall 14 is connected to this end of the tube 20 by another welded sheet metal assembly 25. Further, the arrangement of the zone surrounding the constricting member 24 is as shown in the drawings. A free zone 26 of generally annular shape surrounds the tube 20 and is itself enclosed in the mass of refractory material forming the liner 3. It will be noted that cooling means such as a coil carrying a liquid refrigerant, such as water, can surround the tube 20 in line with the spraying device 19 by extending the zone 26. This coil is not shown in the drawings for reasons of clarity.

Finally, it will be noted that the pipe 7 carries fins which in the present embodiment are four in number and located downstream of the orifices 21. The arrangement clearly appears in FIG. 4. The fins 27 bring the air in rotational motion inside the tube 20.

In the apparatus described the liquid sulphur injecting device 6 ensures both the spraying of the liquid sulphur and the introduction of the primary combustion-supporting air. The mechanical spraying device 19 may be a simple cylindrical orifice or preferably a nozzle dispersing the liquid in a solid conical shape having an apex angle of up to 120°. The liquid sulphur arrives under pressure in the spraying device via pipe 7 The interior of the tube 20 is traversed at high speed by primary combustion-supporting air carried through the conduits 8. The primary air meets within the tube 20 the fin arrangement 27 inclined with respect to the axis and is brought into the rotational motion. The constricting member 24 which limits the diameter of the outlet section of the tube 20 further accelerate the speed of the gas stream.

In order to obtain a rapid and regular combustion of the liquid sulphur, it is necessary to disperse the same in the form of droplets having afineness such that the vaporization is complete before the mixture leaves the chamber. Whatever the type of spraying device used, the diameter of the droplets depends amongst other physical properties on the viscosity of the liquid, the droplets being smaller with lower viscosity. The sulphur is therefore advantageously delivered at a temperature at which the viscosity is a minimum, i.e. between 145° and 155°C.

In pneumatic spraying, where the breaking up of the jet of liquid is effected by the difference of speed between the spraying or driving air and the speed of the liquid in order to obtain the required degree or dispersion leads to a relatively large pressure differential —at least 5 bars—, the corresponding energy requirement would render the method hardly attractive. In mechanical spraying the liquid is driven at a high pressure through a spray nozzle but this does not give droplets which are fine enough; such spraying has moreover, numerous drawbacks; lack of flexibility in controling the flow rate of the liquid sulphur, great risk of forming deposits and clogging necessitating frequent cleaning and interruption. In the present apparatus the combination of the two types of spraying overcomes these disadvantages. With this combined spraying, a relatively coarse spray is effected mechanically, which is then brought to the required fineness pneumatically. In this arrangement the spraying nozzle has a sufficiently large cross-sectional area to avoid deposits and clogging; the quality of the final spray remains that of the pneumatic spraying, but the pressure differential and the energy consumption are substantially reduced with respect to the case where only pneumatic spraying is used which yields the same degree of dispersion. Instead of the pressure differential reaching at least 5 bars, it does not exceed 1 bar under normal operating conditions.

An additional advantage of the spraying arrangement resides in the distribution of the diameter of the drops as a function of the spraying angle: the smallest drops are found in the circumference, the largest drops stay along the axis of the chamber. The drops are therefore subjected to higher temperature when they are larger which enables a complete vaporization within a short chamber.

At the outlet of the injection device the dispersed sulphur and primary air mixture driven in a whirling motion and because of this whirling motion is projected along the conical wall. The low pressure zone which results thereof in the axial portion of the chamber in front of the injection device is filled with very hot burned gases. This low pressure zone radiates towards the sulphur-air mixture, causing the vaporization of the liquid sulphur heating this mixture until it reaches its ignition temperature.

The dividing of all the combustion-supporting air between the primary air supplied by the burner and the secondary air fed along the lateral walls of the chamber is not critical. Preferably, the amount of air used as primary air corresponds to a stoichiometric combustion of sulphur into sulphur dioxide. The amount of secondary air is calculated so as to obtain the desired concentration of $SO_2$ in the final gas mixture. The amount of primary air may be increased by 5 to 10% by decreasing the secondary air by the same amount without being prejudicial to the satisfactory operation of the apparatus. The amount of secondary air that sweeps across the lateral walls of the chamber and the conical wall simply must remain sufficient to protect these walls from the excessive heating due to radiation from the flame. A portion of the secondary air could also be introduced into the chamber downstream of the flame.

The liquid sulphur combustion device described herein above permits very high unitary flow rates of sulphur. These flow rates obviously depend on the pressure present in the chamber: for example, for a chamber pressure of 4.5 bars, the flow rates are between 650 and 900 kilograms per hour and per cubic meter of the chamber. The operation of the apparatus is very versatile; the flow rate of liquid sulphur may be varied by plus or minus 50% with respect to the normal flow rates without observing irregularities or disturbances. It is also very economical: the energy consumption by the compression of the air for combustion is slightly greater than that which would be consumed by the compression of this air from atmospheric pressure to the chamber pressure since the pressure difference between the primary air, which is only a part of the combustion-supporting air, and the gas inside the chamber is very small and preferably less than 1 bar. The construction of the apparatus is simple and its maintenance only rarely causes shut down.

This invention has been illustrated above by an apparatus comprising a single injection device, however a plurality of preferably identical injection devices may easily be utilized. In an industrial set-up, three such injection devices were arranged at 120° about the axis of the apparatus. In this case, a corresponding number of conical portions in the appropriate end of the cylindrical combustion chamber must be provided. Thus with three injection devices arranged at 120° relative to the axis of the cylindrical chamber, three conical zones also having their axes at 120° from each other, relative to the axis of the combustion chamber. The other parts of such an apparatus with a plurality of injection devices are identical to a device having a single injection device of the type described above in detail.

The example which follows illustrates the results obtained in the operation of the sulphur burner of the type described in FIGS. 1–4.

EXAMPLE

The combustion chamber had a diameter of 450 mm Its length between the outlet constricting member of the injection device and the opposite end was 1750 mm. The apex angle of the conical end wall extending the injection device was 30°.

The mechanical spraying device had a spray nozzle having an outlet orifice with a diameter of 1.2 mm. The mechanical spraying device was located 45 mm upstream of the constricting member. The fins in the tube directing the primary air were inclined at 45° with respect to the axis of the combustion chamber. The constricting member had a diameter of 26 mm. The injection device had a liquid sulphur flow rate of 176 kg/hr and a primary air flow rate of 756 kg/hr corresponding to a stoichiometric combustion of sulphur into sulphur dioxide. The secondary air flow rate was 538 kg/hr.

The pressure in the combustion chamber was 4.5 bars absolute and the primary air pressure was 5.3 bars. The pressure difference was therefore 0.8 bar. The temperature in the chamber was about 1150°C.

The analysis of the gases leaving the combustion chamber indicated that the percentage of $SO_2$ was 12%.

The absence of sparks at the outlet end of the apparatus already indicated that the yield was excellent. The amounts of unburned sulphur confirmed this observation; there was less than 0.01 ppm thereof.

During this trial run the amount of the primary air was varied. It was increased by 5% and then 10%. The quantity of unburned sulphur remained very low, i.e. 0.03 ppm at the maximum.

What we claim is:

1. A method for the combustion of liquid sulphur in a combustion chamber, comprising first passing a stream of liquid sulphur under pressure through a small diameter orifice into a stream of primary combustion supporting gas and forming a relatively coarse spray, then passing the mixture of the relatively coarse spray and primary combustion gas through a constriction zone co-axial with the orifice, setting the primary combustion-supporting gas into turbulent motion before entering the constriction zone, then introducing the relatively fine spray leaving the constriction zone coaxially into the apex of a conical space formed by an adjacent conical end wall of the combustion chamber, maintaining the flow rate of the primary combustion stream at a rate at least sufficient to support combustion of substantially all of the sulphur introduced into the primary stream, and introducing secondary combustion-supporting gas along the lateral walls of the combustion chamber downstream of the conical space relative to the direction of flow in the combustion chamber to dilute the products of combustion to the desired concentration and inhibit the transfer of heat of combustion to the walls of the combustion chamber.

2. A method according to claim 1, wherein the gaseous mixture in the combustion chamber is at a pressure between atmospheric pressure and 12 bars.

3. A method according to claim 1, wherein the gaseous mixture in the combustion chamber is at a pressure between atmospheric pressure and 6 bars.

4. A method according to claim 1, wherein the pressure differential between the pressure of the primary combustion-supporting gas and the pressure of the gaseous mixture in the combustion is not greater than 2 bars.

5. A method according to claim 1, wherein the pressure differential between the pressure of the primary combustion-supporting gas and the pressure of the gaseous mixture in the combustion is not greater than 1 bar.

6. A method according to claim 1, wherein the primary and secondary combustion-supporting gases are air, and wherein the primary air flow rate is at least equal to the flow rate of air corresponding to a stoichiometric combustion of sulphur into sulphur dioxide, and wherein the flow rate of the secondary air is a function of the desired degree of concentration of the sulphur dioxide in the gaseous mixture leaving the combustion chamber.

7. A method according to claim 6, wherein the concentration of the sulphur dioxide in the gaseous mixture leaving the combustion chamber is between 4 and 15% by volume.

8. A method according to claim 6, wherein the concentration of the sulphur dioxide in the gaseous mixture leaving the combustion chamber is between 11 and 13% by volume.

9. A method according to claim 1 wherein the motion of the primary combustion-supporting gas is turbulent and rotational.

* * * * *